(12) United States Patent
Chiang et al.

(10) Patent No.: US 10,926,292 B2
(45) Date of Patent: Feb. 23, 2021

(54) FRAME AND SURFACE TREATMENT METHOD FOR THE FRAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Chwan-Hwa Chiang, New Taipei (TW); Chen-Yi Tai, New Taipei (TW); Fei-Long Xiao, Langfang (CN); Jun Guan, Langfang (CN)

(73) Assignees: SHENZHEN FUTAIHONG PRECISION INDUSTRY CO., LTD., Shenzhen (CN); FIH (HONG KONG) LIMITED, Kowloon (HK)

(*) Notice: Subject to any disclaimer, the term of this patent is extended or adjusted under 35 U.S.C. 154(b) by 0 days.

(21) Appl. No.: 16/294,553

(22) Filed: Mar. 6, 2019

(65) Prior Publication Data
US 2020/0122194 A1   Apr. 23, 2020

(30) Foreign Application Priority Data

Oct. 17, 2018  (CN) .......................... 201811210490.2

(51) Int. Cl.
*B32B 5/22*  (2006.01)
*B05D 7/16*  (2006.01)
(Continued)

(52) U.S. Cl.
CPC ................. *B05D 7/16* (2013.01); *B05D 1/02* (2013.01); *B05D 3/0254* (2013.01); *B05D 3/067* (2013.01); *B32B 5/22* (2013.01); *H04M 1/0202* (2013.01)

(58) Field of Classification Search
CPC .......... B05D 7/16; B05D 1/02; B05D 3/0254; B05D 3/067; B32B 5/22; H04M 1/0202
(Continued)

(56) References Cited

U.S. PATENT DOCUMENTS

2012/0189842 A1* 7/2012 Du ........................ C23C 14/10
428/336
2014/0295115 A1* 10/2014 Chiang ............... H04M 1/0283
428/34.6

FOREIGN PATENT DOCUMENTS

CN    203487224 U    3/2014
CN    105363655 A    3/2016
(Continued)

OTHER PUBLICATIONS

Zhang, CN 108246586 A machine translation, Jul. 6, 2018, entire document (Year: 2018).*
(Continued)

*Primary Examiner* — Humera N. Sheikh
*Assistant Examiner* — Katherine A Christy
(74) *Attorney, Agent, or Firm* — ScienBiziP, P.C.

(57) ABSTRACT

A frame includes a substrate, a first priming paint layer, a second priming paint layer, a non-conductive vacuum metallized priming paint layer, and a non-conductive vacuum metallized coating layer. The substrate is made by die casting technology of metal powder. The substrate, the first priming paint layer, the second priming paint layer, the non-conductive vacuum metallized priming paint layer, and the non-conductive vacuum metallized coating layer are stacked in the order written. The disclosure also provides a surface treatment method for the frame.

9 Claims, 4 Drawing Sheets

(51) Int. Cl.
*B05D 1/02* (2006.01)
*B05D 3/06* (2006.01)
*B05D 3/02* (2006.01)
*H04M 1/02* (2006.01)

(58) Field of Classification Search
USPC .......................................................... 428/551
See application file for complete search history.

(56) References Cited

FOREIGN PATENT DOCUMENTS

| CN | 103516843 B | * | 8/2016 |
| CN | 108246586 A | * | 7/2018 |
| CN | 108246586 A | | 7/2018 |

OTHER PUBLICATIONS

Ding et al., CN 103516843 B machine translation, Aug. 17, 2016, entire document (Year: 2016).*

* cited by examiner

FRAME AND SURFACE TREATMENT METHOD FOR THE FRAME

FIELD

The subject matter herein generally relates to a frame and a surface treatment method for the frame.

BACKGROUND

Ultra-thin mobile phones have become the mainstream. Stainless steel main frames are gradually replaced by aluminum main frames. The aluminum main frames made by Computer Numerical Control processes (CNC processes) have advantages of better resistance to deformation, light weight and easy to surface treatment. However, due to a large amount of CNC processes, a long processing cycle, and a large amount of materials, the total production cost of the aluminum main frames made by CNC processes is high.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
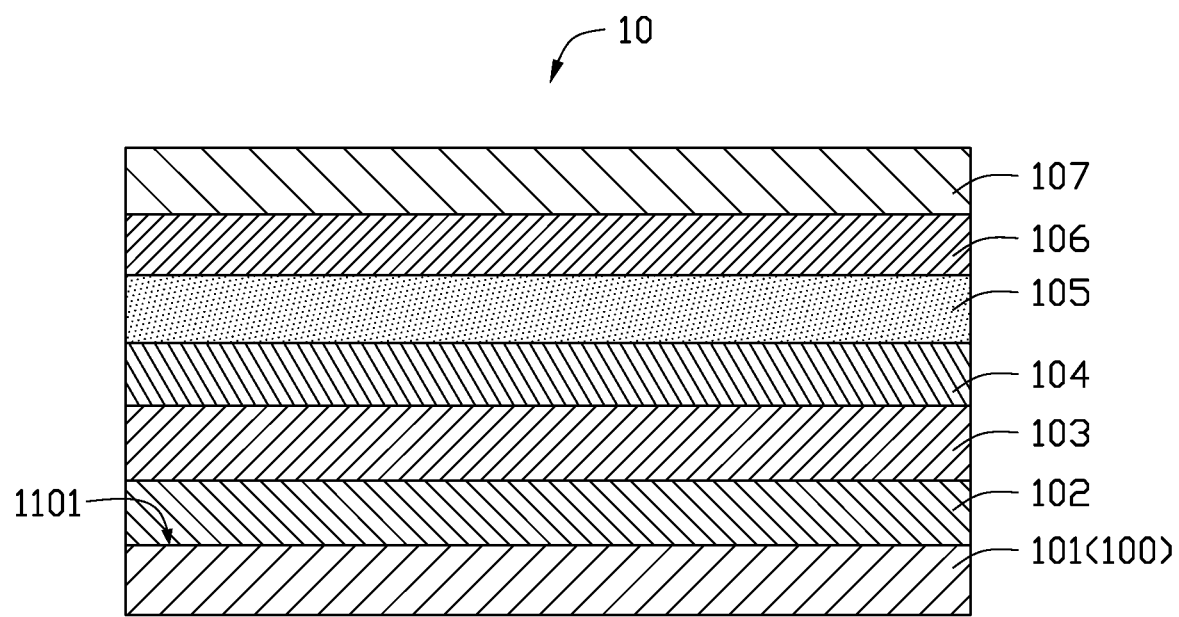
FIG. 1 is a cross-sectional view of an embodiment of a frame.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIG. 1 illustrates an embodiment of a frame 10. The frame 10 may be applied in electronic devices, mechanical device or automobile. The electronic devices may be mobile phones, pads, computers or cameras.

The frame 10 comprises a substrate 101, a first priming paint layer 102, a second priming paint layer 103, a Non-Conductive Vacuum Metallized (NCVM) priming paint layer 104, and a NCVM coating layer 105.

The substrate 101 comprises a surface 1101 as an outer surface of the frame 10.

The substrate 101 may be made of aluminum alloy, zinc alloy, aluminum-magnesium alloy, or titanium alloy.

In at least one embodiment, the substrate 101 can be made by die casting technology of metal powder to save processing materials and processing time. As a result, a plurality of nano-pores is defined on the surface 1101 of the substrate 101.

The first priming paint layer 102 is formed on the surface 1101 of the substrate 101. In at least one embodiment, the first priming paint layer 102 can be made of polyurethane primer. The first priming paint layer 102 has a thickness of 8 μm to 12 μm.

In at least one embodiment, the first priming paint layer 102 may be formed by spraying the primer on the surface 1101 of the substrate 101.

The second priming paint layer 103 is formed on a surface of the first priming paint layer 102 facing away from the substrate 101. In at least one embodiment, the second priming paint layer 103 can be made of polyurethane primer. The first priming paint layer 102 sandwiched between the second priming paint layer 103 and the substrate 101 can improve an adhesion between the second priming paint layer 103 and the substrate 101. The second priming paint layer 103 is covered on the first priming paint layer 102 and fully infilled in the plurality of nano-pores. The second priming paint layer 103 has a thickness of 25 μm to 30 μm.

The NCVM priming paint layer 104 is formed on a surface of the second priming paint layer 103 facing away from the first priming paint layer 102.

In at least one embodiment, the NCVM priming paint layer 104 has a thickness of 6 μm to 10 μm, and is made of polyurethane primer.

The NCVM coating layer 105 is formed on a surface of the NCVM priming paint layer 104 facing away from the second priming paint layer 103 to cause the frame 10 to have a specular highlight effect. In at least one embodiment, the NCVM coating layer 105 can be made of indium or stannum. The NCVM priming paint layer 104 sandwiched between the NCVM coating layer 105 and the second priming paint layer 103 can improve an adhesion between the NCVM coating layer 105 and the second priming paint layer 103.

In at least one embodiment, the NCVM coating layer 105 has a thickness of 50 nm to 200 nm.

In at least one embodiment, the substrate 101, the first priming paint layer 102, the second priming paint layer 103, the NCVM priming paint layer 104, and the NCVM coating layer 105 are stacked in the order as written.

In at least one embodiment, the frame 10 may further comprise a colored well lacquer layer 106. The colored well lacquer layer 106 is formed on a surface of the NCVM coating layer 105 facing away from the NCVM priming paint layer 104. A color of the colored well lacquer layer 106 can be varied as needed, such as black, white or red.

In at least one embodiment, the colored well lacquer layer 106 has a thickness of 6 μm to 10 μm.

In at least one embodiment, the substrate 101, the first priming paint layer 102, the second priming paint layer 103, the NCVM priming paint layer 104, the NCVM coating layer 105, and the colored well lacquer layer 106 are stacked in the order as written.

In at least one embodiment, the frame 10 may further comprise a finish paint layer 107 formed on a surface of the colored well lacquer layer 106 facing away from the NCVM coating layer 105 to prevent the frame 10 from being damaged.

In at least one embodiment, the finish paint layer 107 has a thickness of 20 μm to 25 μm.

In at least one embodiment, the substrate 101, the first priming paint layer 102, the second priming paint layer 103, the NCVM priming paint layer 104, the NCVM coating layer 105, the colored well lacquer layer 106, and the finish paint layer 107 are stacked in the order as written.

Figure 2:
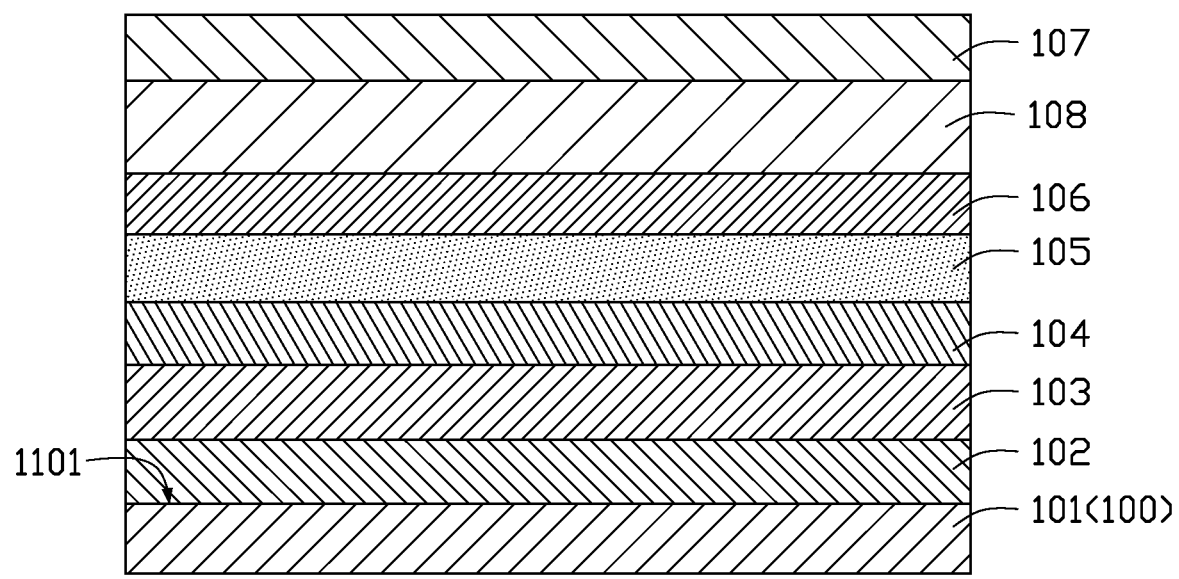
FIG. 2 is a cross-sectional view of another embodiment of a frame.

In at least one embodiment, referring to FIG. 2, the frame 10 may further comprise an optical coating layer 108. The optical coating layer 108 is sandwiched between the colored well lacquer layer 106 and the finish paint layer 107.

In at least one embodiment, the substrate 101, the first priming paint layer 102, the second priming paint layer 103, the NCVM priming paint layer 104, the NCVM coating layer 105, the colored well lacquer layer 106, the optical coating layer 108, and the finish paint layer 107 are stacked in the order as written.

Figure 3:
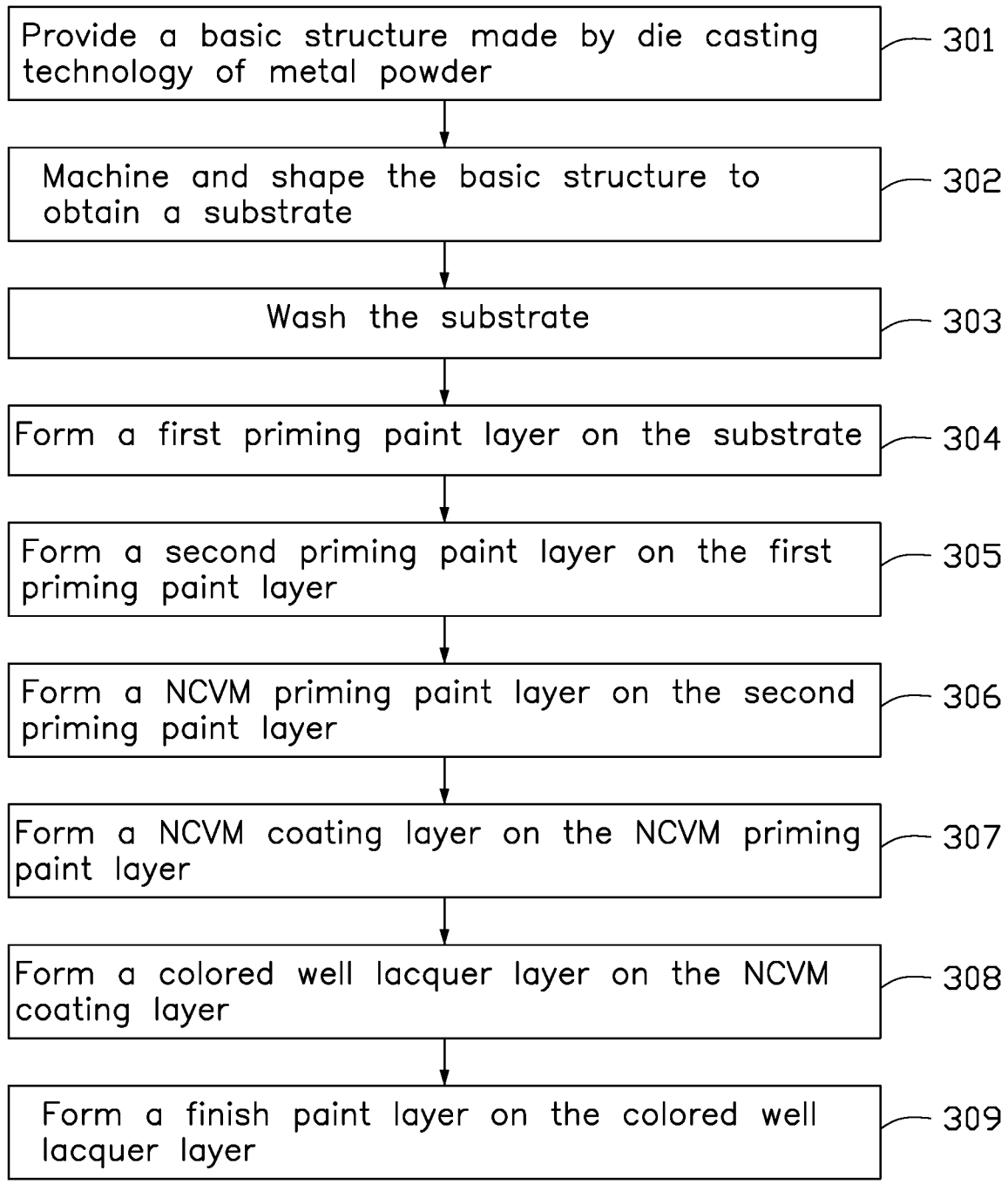
FIG. 3 is a flowchart of an embodiment of a surface treatment method for a frame.

FIG. 3 illustrates a flowchart of a surface treatment method for a frame in accordance with an embodiment. The method is provided by way of embodiments, as there are a variety of ways to carry out the method. Each block shown in FIG. 3 represents one or more processes, methods, or subroutines, carried out in the exemplary method. Furthermore, the illustrated order of blocks is by example only and the order of the blocks can change. Additional blocks may be added or fewer blocks may be utilized, without departing from this disclosure. The method can begin at block 301.

Figure 4:
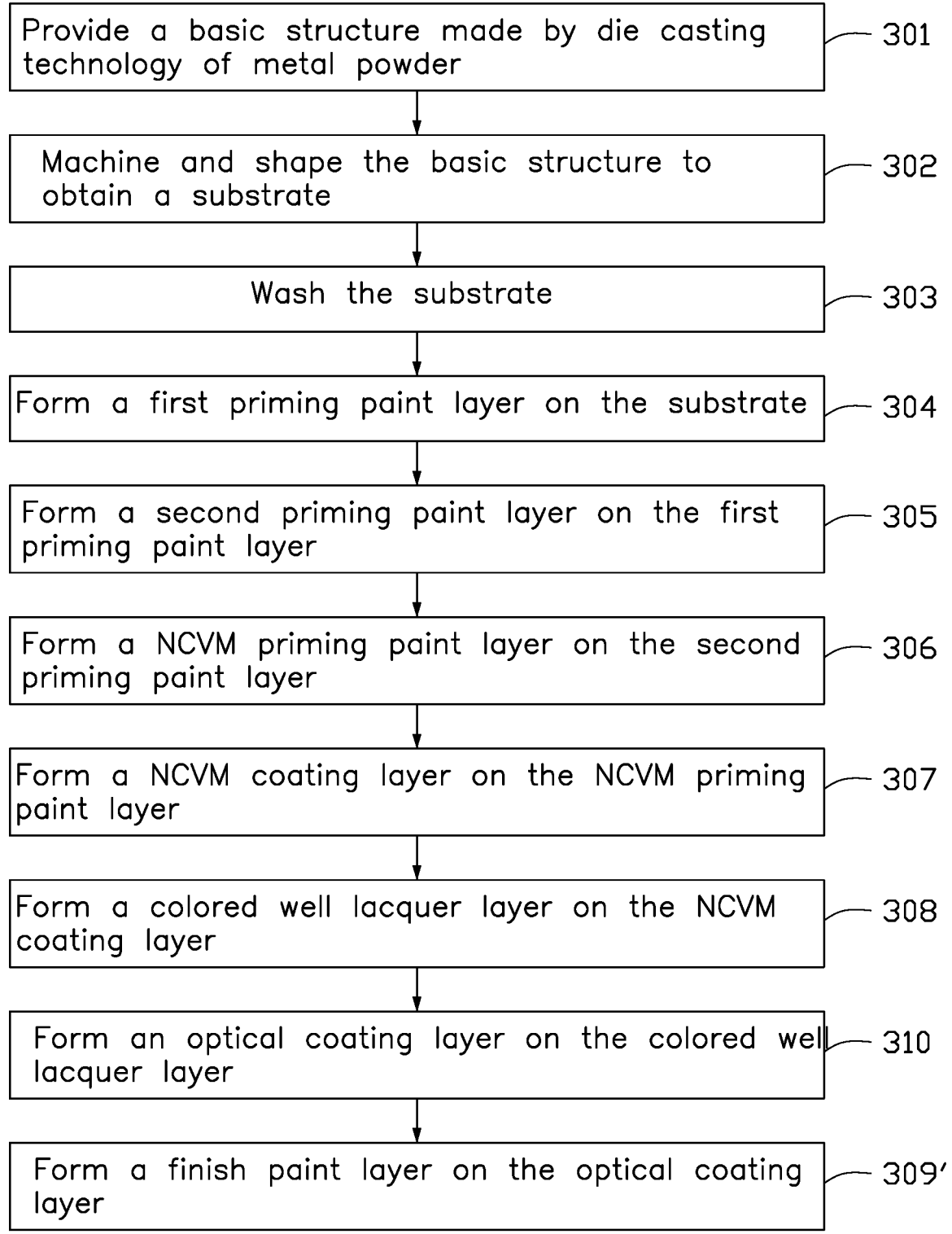
FIG. 4 is a flowchart of another embodiment of a surface treatment method for a frame.

At block 301, referring to FIG. 4, a basic structure 100 comprising a surface 1101 is provided. The basic structure 100 may be made of aluminum alloy, zinc alloy, aluminum-magnesium alloy, or titanium alloy. In at least one embodiment, the basic structure 100 can be made by die casting technology of metal powder, thereby saving processing materials and processing time. A plurality of nano-pores is defined on the surface 1101 of the basic structure 100.

At block 302, the basic structure 100 is machined and shaped to obtain a substrate 101.

At block 303, the substrate 101 is washed.

In at least one embodiment, the substrate 101 is degreased by a degreasing treatment of a degreasing agent and washed by water to remove dust and oil stains on the substrate 101.

At block 304, a first priming paint layer 102 is formed on the surface 1101 of the substrate 101.

In at least one embodiment, the first priming paint layer 102 may be formed by spraying polyurethane primer on the surface 1101 of the substrate 101 and roasting the polyurethane primer on the substrate 101 at a temperature of 75 degrees Celsius for 10 min. The first priming paint layer 102 has a thickness of 8 μm to 12 μm.

At block 305, a second priming paint layer 103 is formed on a surface of the first priming paint layer 102 facing away from the substrate 101.

In at least one embodiment, the second priming paint layer 103 may be formed by spraying polyurethane primer on a surface of the first priming paint layer 102 facing away from the substrate 101 and roasting the polyurethane primer on the substrate 101 at a temperature of 80 degrees Celsius for 2 hours. The second priming paint layer 103 has a thickness of 25 μm to 30 μm.

The first priming paint layer 102 sandwiched between the second priming paint layer 103 and the substrate 101 can improve an adhesion between the second priming paint layer 103 and the substrate 101. The second priming paint layer 103 is covered on the second priming paint layer 103 and fully infilled in the plurality of nano-pores.

At block 306, a Non-Conductive Vacuum Metallized (NCVM) priming paint layer 104 is formed on a surface of the second priming paint layer 103 facing away from the first priming paint layer 102.

In at least one embodiment, a layer is formed on the surface of the second priming paint layer 103 facing away from the first priming paint layer 102 by a non-conductive vacuum metallized process. The layer is exposed under ultraviolet radiation of 800 mj/cm$^2$ to 1000 mj/cm$^2$ at a temperature of 50 degrees Celsius to 60 degrees Celsius for 10 min to 15 min to be cured to form the NCVM priming paint layer 104. In at least one embodiment, the NCVM priming paint layer 104 has a thickness of 6 μm to 10 μm, and is made of polyurethane primer.

At block 307, a NCVM coating layer 105 is formed on a surface of the NCVM priming paint layer 104 facing away from the second priming paint layer 103 to cause the frame 10 to have a specular highlight effect.

The NCVM coating layer 105 is formed by the non-conductive vacuum metallized process. In at least one embodiment, the NCVM coating layer 105 has a thickness of 50 nm to 200 nm, and is made of indium or stannum.

The NCVM priming paint layer 104 sandwiched between the NCVM coating layer 105 and the second priming paint layer 103 can improve an adhesion between the NCVM coating layer 105 and the second priming paint layer 103.

At block 308, a colored well lacquer layer 106 is formed on a surface of the NCVM coating layer 105 facing away from the NCVM priming paint layer 104 and cured. A color of the colored well lacquer layer 106 can be varied as needed, such as black, white or red.

In at least one embodiment, the colored well lacquer layer 106 is cured at a temperature of 65 degrees Celsius to 70 degrees Celsius for 10 min to 15 min. The colored well lacquer layer 106 has a thickness of 6 μm to 10 μm.

In another embodiment, the block 308 may be omitted.

At block 309, a finish paint layer 107 is formed on a surface of the colored well lacquer layer 106 facing away from the NCVM coating layer 105 and cured to prevent the frame 10 from being damaged, thereby obtaining the frame 10.

In at least one embodiment, the finish paint layer 107 is cured by ultraviolet radiation of 800 mj/cm$^2$ to 1200 mj/cm$^2$ at a temperature of 60 degrees Celsius for 6 min. The finish paint layer 107 has a thickness of 20 μm to 25 μm.

In another embodiment, referring to FIG. 4, after forming the colored well lacquer layer 106, the surface treatment method for the frame may further comprise block 310 and block 309'.

At block 310, an optical coating layer 108 is formed on a surface of the colored well lacquer layer 106 facing away from the NCVM coating layer 105.

In at least one embodiment, the optical coating layer 108 may be made of silicon dioxide or titanium dioxide.

At block 309', a finish paint layer 107 is formed on a surface of the optical coating layer 108 facing away from the colored well lacquer layer 106.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A frame comprising:
a substrate made by die casting technology of metal powder;
a first priming paint layer made of polyurethane primer;
a second priming paint layer made of polyurethane primer;
a non-conductive vacuum metallized priming paint layer made of polyurethane primer;
a non-conductive vacuum metallized coating layer made of indium or stannum for providing specular highlight effect;
wherein the substrate, the first priming paint layer, the second priming paint layer, the non-conductive vacuum metallized priming paint layer, and the non-conductive vacuum metallized coating layer are stacked in sequence thereof; the frame further comprises a colored well lacquer layer formed on a surface of the non-conductive vacuum metallized coating layer facing away from the non-conductive vacuum metallized priming paint layer for providing color to the frame.

2. The frame of claim 1, wherein the colored well lacquer layer has a thickness of 6 μm to 10 μm.

3. The frame of claim 1, wherein the frame further comprises a finish paint layer formed on a surface of the colored well lacquer layer facing away from the non-conductive vacuum metallized coating layer.

4. The frame of claim 3, wherein the frame further comprises an optical coating layer sandwiched between the colored well lacquer layer and the finish paint layer.

5. The frame of claim 3, wherein the finish paint layer has a thickness of 20 μm to 25 μm, and is made of silicon dioxide or titanium dioxide.

6. The frame of claim 1, wherein the first priming paint layer has a thickness of 8 μm to 12 μm.

7. The frame of claim 1, wherein the second priming paint layer has a thickness of 25 μm to 30 μm.

8. The frame of claim 1, wherein the non-conductive vacuum metallized priming paint layer has a thickness of 6 μm to 10 μm.

9. The frame of claim 2, wherein the non-conductive vacuum metallized coating layer has a thickness of 50 nm to 200 nm, and is made of indium or stannum.

* * * * *